(12) United States Patent
Lin et al.

(10) Patent No.: US 12,485,919 B2
(45) Date of Patent: Dec. 2, 2025

(54) VEHICLE CONTROL METHOD, VEHICLE CONTROL SYSTEM, AND STORAGE MEDIUM

(71) Applicant: Beijing SemiDrive Technology Ltd., Beijing (CN)

(72) Inventors: Zhongkang Lin, Beijing (CN); Sheng Tao, Beijing (CN); Xuejian Li, Beijing (CN); Hongfeng Zhao, Beijing (CN)

(73) Assignee: Beijing SemiDrive Technology Ltd., Beijing (CN)

( * ) Notice: Subject to any disclaimer, the term of this patent is extended or adjusted under 35 U.S.C. 154(b) by 71 days.

(21) Appl. No.: 18/612,532

(22) Filed: Mar. 21, 2024

(65) Prior Publication Data
US 2025/0018971 A1    Jan. 16, 2025

(30) Foreign Application Priority Data
Jul. 14, 2023 (CN) .......................... 202310868117.0

(51) Int. Cl.
*B60W 60/00* (2020.01)

(52) U.S. Cl.
CPC ....... *B60W 60/001* (2020.02); *B60W 2556/00* (2020.02)

(58) Field of Classification Search
CPC .. B60W 60/001; B60W 2556/00; H04Q 9/00; H04W 4/38; H04W 4/44; B60R 16/0231; B60R 16/037; Y02P 90/02
See application file for complete search history.

(56) References Cited

U.S. PATENT DOCUMENTS

| | | | |
|---|---|---|---|
| 11,269,352 B2* | 3/2022 | Tao .................... | G01C 21/3492 |
| 11,412,574 B2* | 8/2022 | Kasaragod .............. | H04L 67/10 |
| 2003/0171853 A1* | 9/2003 | Otterbach .............. | G08C 19/00 701/1 |
| 2021/0049839 A1* | 2/2021 | Bielby ................... | G07C 5/008 |
| 2021/0314417 A1* | 10/2021 | Chen ...................... | H04L 67/59 |

* cited by examiner

*Primary Examiner* — Masud Ahmed
(74) *Attorney, Agent, or Firm* — ANOVA LAW GROUP, PLLC

(57) ABSTRACT

A vehicle control method includes obtaining sensor information of different modalities of different onboard devices of a vehicle, performing modality transformation on the sensor information to generate short-cycle message information of a unified modality, sending the short-cycle message information to a first data model at a remote end, generating long-cycle message information by a second data model configured at the vehicle based on the sensor information with the different modalities, sending the long-cycle message information to the first data model at the remote end, receiving the vehicle control information returned by the first data model at the remote end, and controlling the vehicle based on the vehicle control information. The short-cycle message information has better real-time performance than the long-cycle message information, and the long-cycle message information is used to trigger the first data model to generate vehicle control information.

20 Claims, 3 Drawing Sheets

VEHICLE CONTROL METHOD, VEHICLE CONTROL SYSTEM, AND STORAGE MEDIUM

CROSS-REFERENCE TO RELATED APPLICATION

The present disclosure claims priority to Chinese Patent Application No. 202310868117.0, filed on Jul. 14, 2023, the entire content of which is incorporated herein by reference.

TECHNICAL FIELD

The present disclosure generally relates to the vehicle control technology field and, more particularly, to a vehicle control method, a vehicle control system, and a storage medium.

BACKGROUND

In existing technology, vehicle control is usually performed by a local control system. The most common method includes, in response to an instruction and an operation of a driver, the local control system performing control on onboard devices of the vehicle. In some highly intelligent vehicles, the local control system performs intelligent control to a certain degree based on sensor information from the onboard devices.

However, with increasing demands for travel quality and the growing complexity of driving scenarios, the information a vehicle can gather is limited, and the information processing capability of a local data model deployed on the vehicle is also limited. Thus, the problems in the vehicle intelligent control under complex scenarios cannot be solved by relying solely on the local data model of the vehicle. Therefore, with the support of the transmission capability of the existing network, how to sufficiently use various types of sensor information of different onboard devices of the vehicle and how to more effectively seek support from other deep learning models with stronger information processing capability to increase the intelligent degree in vehicle control under the complex scenario is a problem that has yet to be solved in the current industry.

SUMMARY

Embodiments of the present disclosure provide a vehicle control method. The method includes obtaining sensor information of different modalities of different onboard devices of a vehicle, performing modality transformation on the sensor information to generate short-cycle message information of a unified modality, sending the short-cycle message information to a first data model at a remote end, generating long-cycle message information by a second data model configured at the vehicle based on the sensor information with the different modalities, sending the long-cycle message information to the first data model at the remote end, receiving the vehicle control information returned by the first data model at the remote end, and controlling the vehicle based on the vehicle control information. The short-cycle message information has better real-time performance than the long-cycle message information, and the long-cycle message information is used to trigger the first data model to generate vehicle control information. The vehicle control information is a response of the first data model at the remote end to the long-cycle message information and is generated based on the short-cycle message information and the long-cycle message information.

Embodiments of the present disclosure provide a vehicle control system, including a first interface, a modality transformation member, a second data model, and a second interface. The first interface is configured to obtain sensor information of different onboard devices with different modalities of a vehicle. The modality transformation member is configured to perform modality transformation on the sensor information to generate short-cycle message information of a unified modality. The second data model is configured to generate long-cycle message information. The short-cycle message information has better real-time performance than the long-cycle message information, and the long-cycle message information is used to trigger the first data model to generate vehicle control information. The second interface is configured to send the short-cycle message information and the long-cycle message information to the first data model at the remote end and receive the vehicle control information returned by the first data model at the remote end. The vehicle control information has a response of the first data model at the remote end to the long-cycle message information and is generated based on the short-cycle message information and the long-cycle message information. The first interface is further configured to send the vehicle control information to a corresponding onboard device to enable the vehicle control information to be recognized and executed by the corresponding onboard device.

Embodiments of the present disclosure provide a non-transitory computer-readable storage medium storing computer-executable instructions that, when executed by a processor, cause the processor to obtain sensor information of different modalities of different onboard devices of a vehicle, perform modality transformation on the sensor information to generate short-cycle message information of a unified modality, send the short-cycle message information to a first data model at a remote end, generate long-cycle message information by a second data model configured at the vehicle based on the sensor information with the different modalities, send the long-cycle message information to the first data model at the remote end, receive the vehicle control information returned by the first data model at the remote end, and control the vehicle based on the vehicle control information. The short-cycle message information has better real-time performance than the long-cycle message information, and the long-cycle message information is used to trigger the first data model to generate vehicle control information. The vehicle control information is a response of the first data model at the remote end to the long-cycle message information and is generated based on the short-cycle message information and the long-cycle message information.

With the vehicle control method, the vehicle control system, and the storage medium of embodiments of the present disclosure, the sensor information with different modalities can be transformed into the sensor information with the unified modality. The sensor information can be sent to the complex data model at the remote end in real time in the form of short-cycle message information with a small data volume and high frequency. With the local data model of the vehicle, the complex scenario information and the task requiring the assistant processing of the complex data model at the remote end and triggering the complex data model to generate the vehicle control information can be sent to the complex data model at the remote end as the long-cycle message information. Thus, the complex data model at the remote end can return the vehicle control information to the vehicle for the to-be-executed task based on the short-cycle message information and the long-cycle message information to realize more accurate, more smart, and more predictive vehicle control under the complex scenario.

The above description is a summary of the technical solution of the present disclosure. To understand the present disclosure, implement the content in the present disclosure, and better understand the purposes, features, and advantages of the present disclosure, specific embodiments of the present disclosure are described below.

BRIEF DESCRIPTION OF THE DRAWINGS

The following drawings are merely examples for illustrative purposes according to various disclosed embodiments and are not intended to limit the scope of the present disclosure.

DETAILED DESCRIPTION OF THE EMBODIMENTS

To cause those skilled in the art to better understand the technical solutions of the present disclosure, the present disclosure is described in detail in connection with the accompanying drawings and embodiments of the present disclosure. Embodiments of the present disclosure are described in detail below in connection with the accompanying drawings and specific embodiments. However, the description of embodiments of the present disclosure is not used to limit the present disclosure.

The terms "first," "second," and similar words used in the present disclosure do not represent any sequence, quantity, or importance and are only used for distinguishing. The terms "including" and "containing" indicate that the element before the terms encompasses the elements listed after the terms and does not exclude the possibility of encompassing other elements. The execution sequence of the steps in the method described in connection with the accompanying drawings is not limited. As long as the logical relationship between the steps is not affected, a plurality of steps can be combined into a single step, a single step can be divided into a plurality of steps, or the execution sequence of the steps can be switched as needed.

The term "and/or" in the present disclosure is merely an association relationship describing the associated object and indicates that three relationships can exist. For example, A and/or B can include A alone, A and B, and B alone. In the present disclosure, character "/" generally indicates that the associated objects that are before and after "/" are in an or relationship.

Figure 1:
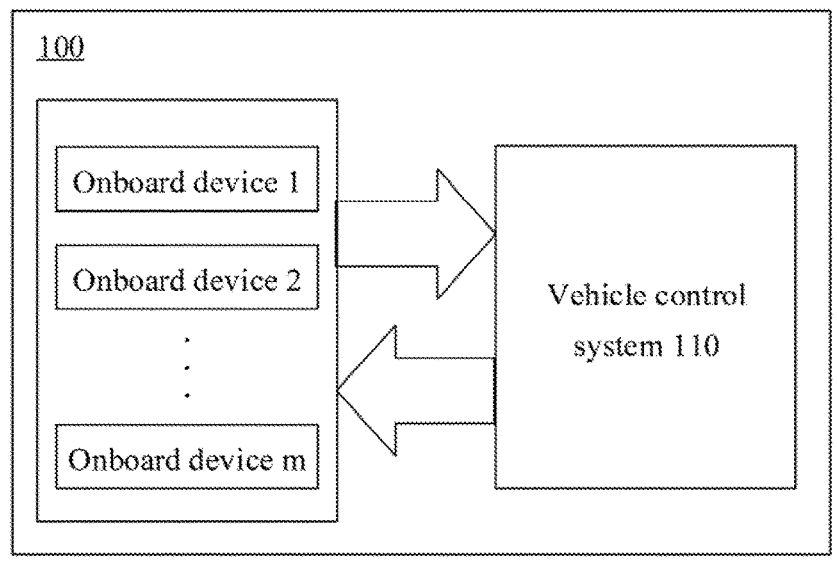
FIG. 1 illustrates a schematic diagram of some onboard devices of an existing vehicle according to some embodiments of the present disclosure.

FIG. 1 illustrates a schematic diagram of a number of onboard devices of an existing vehicle according to some embodiments of the present disclosure. As shown in FIG. 1, a vehicle 100 includes a plurality of onboard devices, such as an onboard device 1, an onboard device 2, . . . , and an onboard device m, and a vehicle control system 110. The onboard devices can include various vehicle sensors and vehicle actuators configured to control the vehicle operation state. In the existing technology, in response to the operation of a passenger in the vehicle such as a driver, the vehicle control system 110 can perform a corresponding operation and control on the vehicle actuators. The various vehicle sensors can also send the collected vehicle sensor information to the vehicle control system 110 as references for controlling the vehicle and providing notifications.

Figure 2:
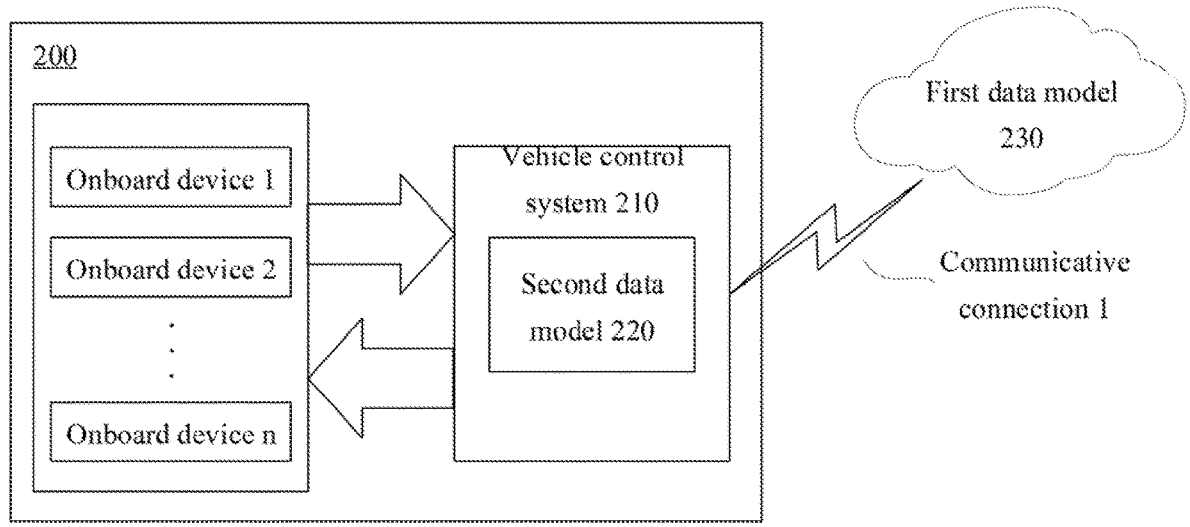
FIG. 2 illustrates a schematic diagram of an onboard device and a related device of a vehicle according to some embodiments of the present disclosure.

FIG. 2 illustrates a schematic diagram of an onboard device and an associated device of a vehicle according to some embodiments of the present disclosure. Similar to the vehicle 100 in FIG. 1, a vehicle 200 in FIG. 2 includes a plurality of onboard devices such as an onboard device 1, an onboard device 2, . . . , and an onboard device n, and a vehicle control system 210. A vehicle control system 210 can also obtain different types and different modalities of sensor information from the onboard devices. The difference includes that the vehicle control system 210 also includes a second data model 220, and the vehicle control system 210 can perform information interaction with the first data model 230 at a remote end through the communicative connection 1. Thus, the vehicle control system 210 can perform control on the vehicle 200 using the second data model 220 and the first data model 230 at the remote end on the basis that different onboard devices have different modalities of sensor information. The functions of the second data model 220 and the first data model 230 at the remote end and the functional roles of the second data model 220 and the first data model 230 at the remote end in the vehicle control will be described in detail in connection with FIG. 3.

In some embodiments, vehicle sensors of the onboard devices can obtain different types and different modalities of sensor information, such as a vehicle speed, a vehicle acceleration, an engine rotation speed, temperatures of the engine/transmission/brakes/tires, an oil level, pressures in tires/brake fluid/brakes, a vehicle weight, an inclination angle, an engine vibration frequency, a wheel rolling status, and a vehicle location, which are related to vehicle. performance, safety, and position. The sensor information can also include a vehicle load, a vehicle operation mode, temperatures and humidities/air quality/magnetic field/sound/light/oxygen content/oxide concentration inside and around the vehicle, road surface conditions, weather conditions, etc., which are related to improving the driving experience, optimizing fuel economy, and ensuring passenger health.

Furthermore, some onboard devices can be configured to collect passenger-related sensor information. For example, a near-infrared spectroscopy device can be configured to collect health monitoring data such as the heart rate and blood sugar of the passengers of the vehicle. The temperature sensor can be configured to collect the body temperatures of the passengers. The pressure sensor can be configured to collect the weights of the passengers. The infrared sensor/camera can be configured to shoot infrared and visible light images and videos of the passengers and the environment. The fingerprint collector or touch screen can be configured to collect fingerprint data.

In some embodiments, the onboard devices can further include an execution device configured to control the operation of the vehicle, for example, the adjustment devices for seat postures and temperature, the adjustment device for temperature and humidity in the vehicle, the music player configured to broadcast warnings, instructions, and atmosphere adjusting music, and a display device configured to display image and video information such as traffic situation, weather, and calendar. In some embodiments, the onboard devices with different usages can be integrated into a compound onboard device. For example, a management robot can be arranged in the vehicle cab. The robot can be integrated with audio information collection and audio play functions. For another example, the smart interaction screen in the vehicle cab can be integrated with a plurality of functions, such as fingerprint collection, audio information collection, audio playing, and image and video display, which are not limited in the present disclosure.

In some other embodiments, when the vehicle has the autonomous drive function, the onboard device can also be the execution device for directly controlling the driving of the vehicle, for example, the execution device controlling the vehicle to accelerate, decelerate, turn, and brake, which is not listed in the present disclosure. The vehicle control system 210 can control the vehicle 200 to operate, maintain or change a driving status, maintain or change the cabin configuration or interact with the passengers in the vehicle 200 by controlling the execution devices of the onboard devices. More specifically, for example, switching between different driving modes (e.g., sport mode, eco mode), engaging the automatic parking system, adjusting the interior lighting of the vehicle and play a video, etc.

The various sensor information generated by the onboard devices and the various control information provided to the onboard vehicle as the execution devices can have different modalities. For example, body temperature data collected by the temperature sensor can be numerical or text information. The image or video collected by the camera can have a static or dynamic image encoding format or a video encoding format. In addition, the sensor information generated by the onboard devices can also be formatted data or a data packet according to a certain standard or an encoding method, which is not limited in the present disclosure, as long as the sensor information can be parsed according to the corresponding standard or decoding method.

Figure 3:
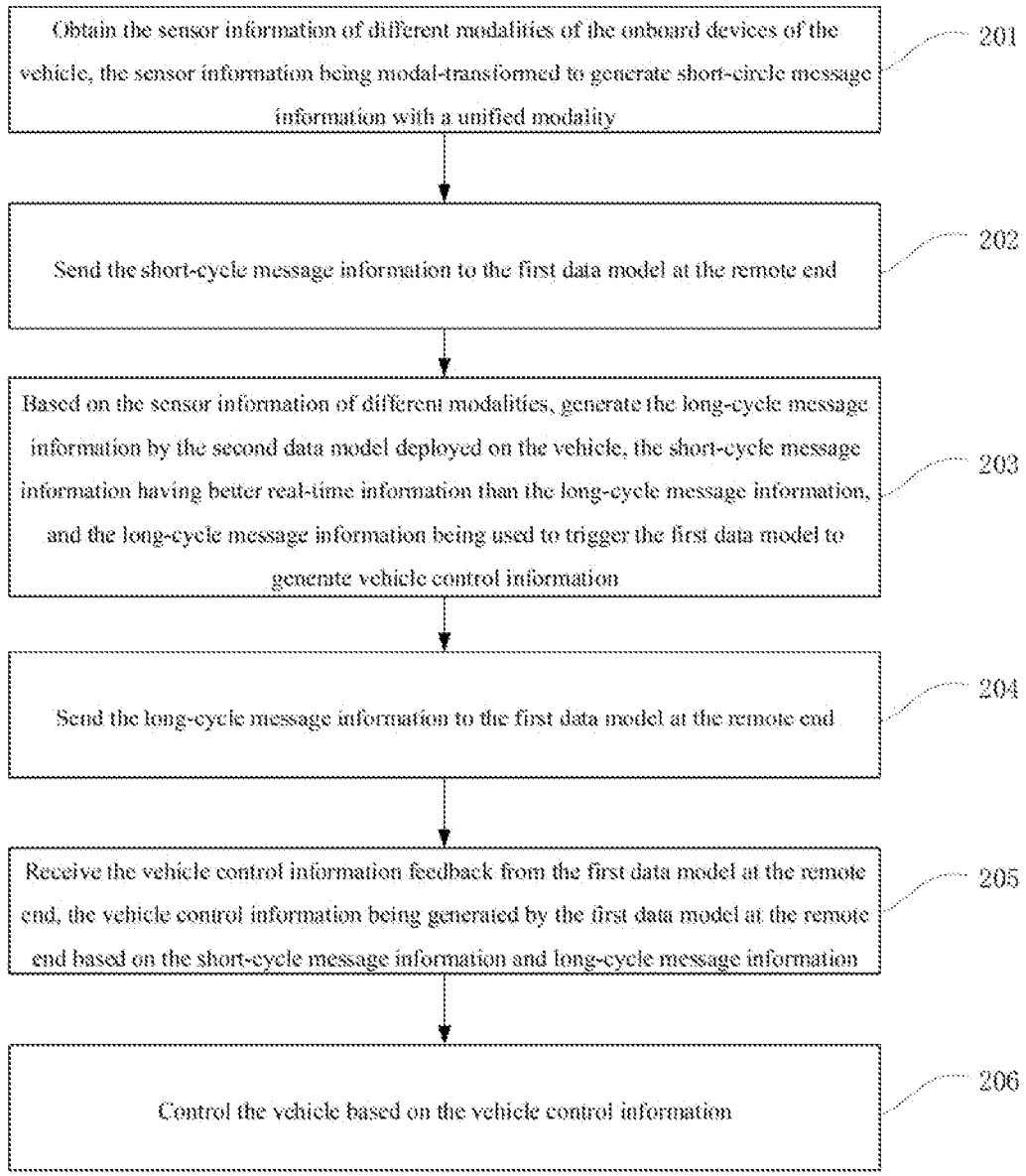
FIG. 3 illustrates a schematic flowchart of a vehicle control method according to some embodiments of the present disclosure.

FIG. 3 illustrates a schematic flowchart of a vehicle control method according to some embodiments of the present disclosure.

As shown in FIG. 3, at 201, the sensor information of different modalities of the onboard devices of the vehicle is obtained, and the sensor information is modal-transformed to generate short-circle message information with a unified modality. The sensor information can have different modalities, for example, text, image, audio, and video, or have an information format satisfying a certain rule, which depends on the type of the onboard device. For example, when the vehicle includes an onboard device for odor detection, the sensor information can also include odor information. In some embodiments, for the sensor information generated according to a certain format, if the sensor information needs to be understood or used for inference and prediction, modality transformation may need to be performed on the sensor information to generate short-cycle message information with a unified modality.

In some embodiments, when the sensor information of a specific modality is transformed into a unified modality, recognition and determination may need to be performed according to predetermined rules. Taking the transformation of automotive kinematic information as an example, wave analog signals collected by sensors at various parts of the vehicle can be subjected to analog-to-digital conversion, and then vehicle kinematic parameters (including throttle opening, steering wheel angle, tire rotation speed curve, fuel tank remaining volume, actual vehicle load, vehicle acceleration, angular velocity, etc.) can be solved through waveform analysis. Then, a program-readable format (e.g., json format text information) can be used as the unified modality to generate the vehicle kinematic status text of the modality as the short-cycle message information for output. For another example, for visual sensor information such as image and video, since the data format of the visual sensor information is image encoding or video encoding format and cannot be directly used, during the modality transformation, corresponding description information can be extracted from the visual information according to the predetermined mapping model. For example, the infrared imaging data can be set to be mapped to the description information of the cab temperature distribution. The description information can be, for example, a text modality. The audio modality information collected by the microphone can be mapped to the text modality information. In some other embodiments, facial recognition, human feature description, and emotion recognition can be performed based on the video recorded by the camera, which can be mapped and generate multi-dimensional text including identities, features, and emotions related to the passengers, which are not listed here in detail.

In some embodiments, the short-cycle message information can be generated at a determined time with a short-cycle. For example, the short-cycle message information can be generated after the modality transformation each time interval based on brake system data of the vehicle, including a comprehensive brake oil status, a brake pad status, a brake disc status, etc. In some other embodiments, the short-cycle message information can be triggered by an event. For example, when the vehicle brakes and stops, the modality transformation can be subsequently performed on the information related to the braking and stopping operations, such as a braking distance, a distance from a vehicle in the front after the vehicle stops, etc., to generate the short-cycle message information.

At 202, the short-cycle message information is sent to the first data model at the remote end. Generally, the remote end can include a special-purpose or general-purpose server or server cluster deployed in the cloud. The vehicle can be communicatively connected to the remote end through a communication link such as satellite communication links and vehicle-to-vehicle networks, or communication networks. In some embodiments, the unified modality can include but is not limited to text and can also include other modalities such as formatted information, which is not limited in the present disclosure. Since the bandwidth and capacity of the wireless communication link and network are limited, the data volume of the short-cycle message information of the unified modality may not be too large, which can be sent to the first data model at the remote end. In some other embodiments, to reduce the transfer volume of the data as much as possible, the sensor information can be further processed when being performed with the modality transformation to generate the short-cycle message information of the unified modality. For example, after the audio is transformed into the text, the text information can be summarized to reduce the transfer data volume. Meanwhile, the short-cycle message generated based on the text summary can be more easily used by the first data model.

In some embodiments, a piece of short-cycle message information can include a plurality of types of sensor information. Therefore, the unified modality can use the multi-dimensional text, and the short-cycle message can include a type identifier corresponding to the multi-dimensional text. Thus, the first data model can recognize the content of the multi-dimensional text based on the type identifier.

At 203, based on the sensor information of different modalities, the long-cycle message information is generated by the second data model deployed on the vehicle. The short-cycle message information has better real-time information than the long-cycle message information. The long-cycle message information can be used to trigger the first data model to generate vehicle control information.

The second data model can be a real-time running data model deployed on the vehicle. When the long-cycle message information is generated, the long-cycle message information can be further generated using the short-cycle message information of the unified modality generated based on the sensor information of different modalities, or based on the sensor information of different modalities.

Continuing with the example of braking and stopping, in addition to generating the short-cycle message information immediately after each braking and stopping operation, when a plurality of times of braking and stopping occur within a certain period (for example, a predetermined time window length and a threshold of the times of braking and stopping in the time window can be pre-determined), the sequence of the plurality of pieces of short-cycle message information of the unified modality generated by the plurality of braking and stopping operations and the short-cycle message information after performing the modality transformation on the vehicle image of the video modality recorded by the cameras from a plurality of angles within a period from starting braking the vehicle to the vehicle being stopped performed by the driver each time can be used as inputs for the second data model. The inference and prediction result as an output of the second data model can be used as an example and can include braking performance decreasing and ground surface wet and slippery, braking performance decreasing and the ground surface being normal, and braking performance being normal and the front vehicle braking abruptly. Further, the long-cycle message information can be generated based on the prediction result of the second data model. For example, when the prediction result of the second data model is braking performance decreasing and the ground surface being normal, the following task of detecting whether the tires need to be replaced can be reported to the remote end in the long-cycle message information. The task can be processed by the remote end, and the corresponding vehicle control information can be fed back to the vehicle. In some embodiments, for example, when the prediction result of the second data model is braking performance being normal and the front vehicle braking abruptly, the vehicle control system can issue a notification of "please keep a distance with the front vehicle" to the vehicle based on the prediction result, which is not described in detail.

In addition to event/condition triggering, the long-cycle message information can be generated according to the pre-determined cycle at a determined time and sent to the remote end. Specific content can include, for example, conversations between passengers of a cycle, which is not limited here. In summary, the generation cycle of the long-cycle message can be longer than the generation cycle of the short-cycle message. From the real-time perspective, the short-cycle message information can have better real-time performance than the long-cycle message information.

At 204, the long-cycle message information is sent to the first data model at the remote end. The first data model can be a deep learning network located at the far-end server with complex information processing capability and high-level logical analysis capability, which can understand and analyze the tasks included in the long-cycle message information as an input and autonomously determine and generate rich and mutually supportive data and materials associated with the vehicle control information based on the long-cycle message information. Thus, the first data model can generate more accurate and more reliable vehicle control information. In some embodiments, the first data model can be obtained, for example, by performing a slight adjustment on the GPT4 language model to cause the first data model to learn the domain knowledge and retrieve relevant data, to generate more accurate and reliable vehicle control information. Specifically, the first data model can be fine-tuned based on models like GPT-4 for domain-specific knowledge and can retrieve relevant data by retrieving the plug-in system, which is not limited here.

At 205, the vehicle control information feedback from the first data model at the remote end is received. The vehicle control information can be generated by the first data model at the remote end based on the short-cycle message information and long-cycle message information. Continuing with the example of braking and stopping, when the first data model receives a task of checking whether the tire needs to be replaced in the long-cycle message information, based on understanding and analyzing the long-cycle message information, one or a plurality of pieces of short-cycle message information related to the task of checking whether the tire needs to be replaced can be determined. The long-cycle message information and the short-cycle message information can be combined to generate the vehicle control information, which can be fed back to the vehicle. For example, when the first data model determines that the tire of the vehicle needs to be replaced, a notification of replacing the tire can be output and can include a notification of navigating to the vehicle repair facility.

At 206, the vehicle is controlled based on the vehicle control information. In some embodiments, the vehicle control information provided as feedback by the first data model can be one of a plurality of pieces of control information for a single onboard device or a plurality of onboard devices. In some embodiments, the vehicle control information can be multi-modality, for example, a compound text by combining the text and the corresponding image or video. In some other embodiments, to reduce the data transfer volume between the first data model at the remote end and the vehicle, the vehicle control information can also be text information of a single modality, which includes description information of the text modality for expecting displaying information of other modalities such as audio, image, and video. Thus, the data transfer load can be greatly reduced, and the real-time performance of the vehicle control information can be improved.

Thus, in the vehicle control method of embodiments of the present disclosure, the sensor information with different modalities of different onboard devices in the vehicle can be transformed into the unified modality to generate the short-cycle message information with a small data volume. Thus, the short-cycle message information can be transferred to the first data model at the remote end in real-time at a high frequency. By deploying the second data model locally at the vehicle, the complex scenario with the long-cycle of the vehicle and the task that needs to be processed with the assistance of the first data model at the remote end can be sent to the remote end as the long-cycle message information. Thus, the first data model can generate the vehicle control information for the task to be performed by using the strong learning capability and the information processing capability of the first data model based on the short-cycle message information and the long-cycle message information. Thus, the vehicle can realize more accurate and more predictive vehicle smart control under a complex scenario.

In some embodiments, when the vehicle is controlled based on the vehicle control information, corresponding modality transformation can be performed on the vehicle control information according to different onboard devices. Thus, the interaction information and/or control instruction with different modalities can be generated after the modality transformation and can be recognized and executed by the corresponding onboard device. For example, when the first data model generates the vehicle control information, to reduce the transfer data volume or for another reason, multi-modality information such as the audio, image, and video can be transformed into the description information of the unified modality. Thus, after the vehicle receives the vehicle control information, language, UI graphics, emojis, animations/videos corresponding to the description information can be generated using a corresponding audio-generating member, an image/video generating member, etc., according to the description information of the unified modality. Thus, the generated interaction information of different modalities can be recognized and executed by an interactive onboard device for playback or display. In some other embodiments, when the vehicle control information includes instructions for control of a certain onboard device, the control instruction can also be transformed into the control data with the corresponding modality to be recognized and executed by the onboard device.

In some embodiments, a plurality of sets of vehicle control information can be generated by the first data model. Different sets of vehicle control information can correspond to different time points. Continuing with the example of the task of checking whether the tire needs to be replaced, when the first data model determines that the tire of the vehicle needs to be replaced, the vehicle control information including "the tire (left front tire) of the vehicle needs to be replaced, please proceed to a 4S shop for inspection" can be sent to the vehicle. Then, according to the destination address and real-time location information included in the short-cycle message information of the vehicle, a series of vehicle control information including navigation information to the appropriate 4S shops or parking guidance information. That is, the vehicle control information corresponding to a later time point can be generated with the short-cycle message information of the vehicle.

In addition, after receiving the vehicle control information generated by the first data model, the short-cycle message information of the vehicle generated based on the feedback information of reminding me in three days" can be received. Then, the vehicle control information including "the tire (left front tire) of the vehicle needs to be replaced, please proceed to a 4S shop for inspection" can be sent again after three days. That is, the vehicle control information corresponding to a later time point can be generated in connection with the short-cycle message information of the response information of the vehicle control information corresponding to the earlier time point.

In addition, when the first data model generates the vehicle control information, the first data model can determine the related short-cycle message information and the background information related to the vehicle based on the long-cycle message information. For example, at the remote end, the received short-cycle message information and long-cycle message information can be stored in a retrievable database. The first data model, for example, can be realized by using the GPT-4+ retrieval plugin system. Thus, according to the task in the long-cycle message information or the keywords and clue images related to the task, the retrieval plugin system can be used to retrieve the related short-cycle/long-cycle message information and other background information in the database. The retrieved result can be input into the first data model. Then, the first data model can generate more accurate and more reliable vehicle control information based on the related short-cycle message information and the long-cycle message information in connection with the background information.

In some embodiments, the long-cycle message information generated by the second data model can include task title information, such as "check whether the tire needs to be replaced," or can also include the task title information and summary information. The summary information can be generated by the second data model based on information related to the task title information in the sensor information of different modalities. For example, in the example of braking and parking, the summary information can be generated based on the sensor information of the braking system corresponding to the braking and parking operations in the time window related to the task title information of "check whether the tire needs to be replaced" and the sensor information of different modalities of the vehicle images captured by the cameras from a plurality of angles. For example, the summary information can be similar to "the first braking time is xx seconds, the stopping distance is xx meters, the second braking time is xx seconds, the stopping distance is xx meters, the distance to the front vehicle after stopping is xx meters. . . . " The form and content of the summary information is not limited.

In some embodiments, the vehicle control information can be generated by the first data model based on the related short-cycle message information, the long-cycle message information, and the background information related to the vehicle. When the long-cycle message information includes the summary information, the related short-cycle message information and the summary information of the long-cycle message information can be fused. Then, the fused short-cycle message information and the summary information can be combined with the background information to generate the vehicle control information. The method for fusing the short-cycle message information and the summary information of the long-cycle message information is not limited in the present disclosure, as long as the information can be more complete and more accurate and have better real-time performance after fusion to facilitate the first data model to generate more reliable vehicle control information. The background information, for example, can include real-time information related to the vehicle driving recognized or obtained by the first data model, such as the traffic information, weather information, the status information of the passengers, statistical information of the vehicle parts or components at the vehicle or another vehicle, or a combination thereof. In some embodiments, the first data model can be deployed in the cloud. The cloud can have broader data sources. Thus, compared to the single vehicle, the data related to driving that is richer, more complete, and more predictive, and have better real-time performance can be obtained. For example, for the task of "check whether the tire needs to be replaced," the first data model can obtain statistical data of driving mileage of the tire with the same model number at other vehicles according to the model number of the tire of the vehicle. By analyzing the statistical data, the first data model can find out that the tire of the model number has low driving mileage, and tires of other vehicles were replaced in advance. Such statistical information cannot be obtained by the vehicle itself and can be provided to the first data model as the background information. The first data model can generate the vehicle control information of "replace the tire in time" according to the statistical information. In some other embodiments, when the tire is not able to be replaced immediately, the first data model can send a recommendation of "parking the vehicle in the underground parking lot" further according to the weather condition as the background information and to avoid the safety issue due to excessive temperature and pressure, and the vehicle control information of navigating to the underground parking lot. Thus, with the above method, more complete and predictive vehicle control information can be provided to the vehicle.

In some embodiments, when generating the long-cycle message information, the second data model can obtain multi-modality sensor information from the corresponding onboard device except for directly using the short-cycle message information generated previously based on the sensor information of different modalities, especially when the short-cycle message information does not include the information required for generating the long-cycle message information. Thus, the second data model may need to have a multi-modality information processing capability. That is, the second data model can be a multi-modality information processing model. The second data model can be trained based on the different statuses of the vehicle, the multi-modality information corresponding to the combinations of different statuses of the onboard devices, and task conditions corresponding to the combinations. For example, the second data model can include GPT 3.5 (a natural language processing model version 3.5 by OpenAI), ChatGLM-6B (an open source conversation language model supporting Chinese and English), LLAMA (a large language model by Meta), and a pre-trained model based on an Encoder-Decoder structure. Based on the trained pre-trained model, a training data set written by domain inspection experts or provided by the vehicle manufacturer can be inputted and include a large amount of training data consisting of different parameters/statuses of the members and the onboard devices of the vehicle and the combination thereof under different vehicle driving conditions (e.g., vehicle being static or driving, vehicle driving in rainy and snowy days). The corresponding real vehicle driving conditions/onboard device failure modes/surrounding environment conditions can be used as marked true values of the training data. Through training, the second data model can have domain knowledge. In some embodiments, the trained second data model can accurately output the failure modes (including a plurality of non-failure statuses) of different aspects, such as vehicle, onboard device, and vehicle driving environment, according to single modality or multi-modality to-be-predicted data that is inputted to the second data model. The output format and the included content are not limited in the present disclosure.

The short-cycle message information of embodiments of the present disclosure has a small data volume and a short generation cycle and needs to be sent frequently. The long-cycle message information can have a long generation cycle and a large data volume for a single piece of message information. Thus, to ensure that the short-cycle message information and the long-cycle message information are smoothly and safely sent to the first data model at the remote end in real-time, the short-cycle message information and the long-cycle message information can be sent to the first data model at the remote end in a streaming encryption method. In some embodiments, the short-cycle message information can be encrypted by a non-symmetrical algorithm (e.g., RSA), then transferred with encryption and authenticated through the HTTPS protocol, and subsequently sent to the first data model at the remote end. The long-cycle message information with a large data volume can be verified by a long text verification module. Then, data division can be performed on the long-cycle message information by a streaming text transmission device. After the non-symmetric encryption algorithm such as RSA (a public key encryption algorithm) is performed on the divided long-cycle message information, the divided long-cycle message information can be transferred with encryption and authenticated through the HTTPS network protocol, and the data stream can be sent to the first data model at the remote end. After receiving the short-cycle message information and the long-cycle message information, the first data model at the remote end can connect the data stream to the verification and authentication module to authenticate the sending source. The decryption and data block merging can be performed, and a comparison can be performed on the format, length, MD5 value (a cryptographic hash function of the encryption algorithm) of the message to ensure data integrity, confidentiality, and source security. After decryption, the complete short-cycle/long-cycle message information can be used by the first data model to generate the corresponding vehicle control information.

Figure 4:
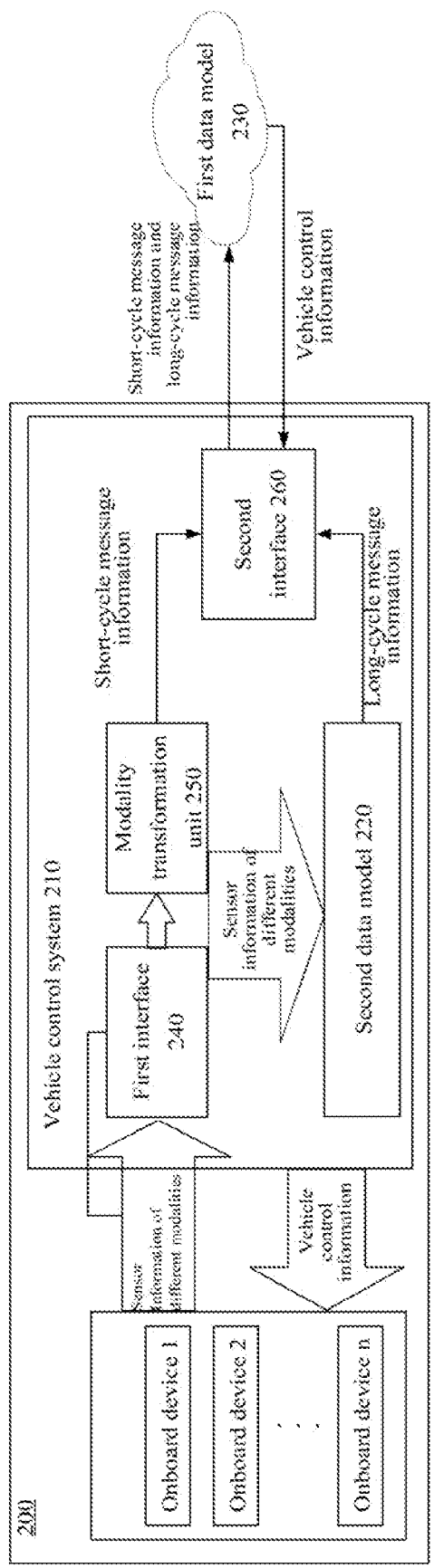
FIG. 4 illustrates a schematic block diagram of a vehicle control system according to some embodiments of the present disclosure.

Embodiments of the present disclosure further provide a vehicle control system. FIG. 4 illustrates a schematic block diagram of the vehicle control system according to some embodiments of the present disclosure. As shown in FIG. 4, the vehicle control system 210 of the vehicle 200 at least includes a first interface, a modality transformation member 250, a second data model 220, and a second interface 260. In addition, the vehicle 200 also includes a plurality of onboard devices, such as onboard device 1 to onboard device n.

The first interface 240 can be configured to obtain the sensor information with different modalities from different onboard devices of the vehicle 200. The first interface 240 can be directly and electrically connected to the onboard devices through hardware or can be connected to the onboard device through indirect coupling between communication units, which is not limited in the present disclosure.

The modality transformation member 250 can be configured to transform the sensor information with different modalities from different onboard devices of the vehicle 200 to generate the short-cycle message information with the unified modality.

The second data model 220 can be configured to generate the long-cycle message information based on the sensor information with different modalities. In addition, the short-cycle message information can have a better real-time performance than the long-cycle message information. The long-cycle message information can be used to trigger the first data model 230 to generate the vehicle control information.

The second interface 260 can also be further configured to send the short-cycle message information and the long-cycle message information to the first data model 230 at the remote end and receive the feedback of the vehicle control information from the first data model 230 at the remote end. This vehicle control information can be the response of the first data model 230 at the remote end to the long-cycle message information and can be generated based on the short-cycle message information and the long-cycle message information.

The first interface 240 can also be further configured to transfer the vehicle control information to the corresponding onboard device. Thus, the vehicle control information can be recognized and executed by the corresponding onboard device.

In some other embodiments, to cause the vehicle control information to be recognized and executed by the corresponding onboard device, the modality transformation member 250 can be further configured to perform corresponding modality transformation on the vehicle control information according to different controlled onboard devices. Thus, the interaction information and/or control instructions with different modalities generated after the modality transformation can be recognized and executed by the corresponding onboard devices. The modality transformation function can be performed at the onboard devices autonomously, which is not limited in the present disclosure.

Embodiments of the present disclosure further provide a non-transitory computer-readable storage medium storing computer-executable instructions that, when executed by a processor, cause the processor to implement the vehicle control method of embodiments of the present disclosure.

When the computer-executable instructions are loaded and executed on a computer, the flowcharts or functions of embodiments of the present disclosure can be all or partially generated. The computer can be a general-purpose computer, a dedicated computer, a computer network, or other programmable devices. The computer-executable instructions can be stored in a computer-readable storage medium and can be transferred from one computer-readable storage medium to another computer-readable storage medium. For example, the computer-executable instructions can be transferred from one website, computer, server, or data center to another website, computer, server, or data center through a wired (e.g., coaxial cable, optical fiber, digital subscriber line) or wireless (e.g., infrared, wireless, microwave) method. The non-transitory computer-readable storage medium can be any medium that the computer can access or a data storage device including one or more servers and data centers integrated by the computer-readable media. The computer-readable medium can be a magnetic medium (e.g., floppy disks, hard drives, tapes), an optical medium (e.g., DVDs), or a semiconductor medium (e.g., solid-state drives).

The vehicle of embodiments of the present disclosure can include a general motor vehicle, such as a passenger car, SUV, MPV, bus, truck, and other vehicles for transporting goods or passengers, a various water transport tool including boats and ships, and an aircraft. The vehicle can also be a hybrid vehicle, an electric vehicle, a fuel vehicle, a plug-in hybrid vehicle, a fuel cell vehicle, or another alternative fuel vehicle. The hybrid vehicle can be a vehicle with two or more power sources. The electric vehicle can include a pure electric vehicle and an extended-range electric vehicle, which is not limited in the present disclosure.

In embodiments of the present disclosure, the processor can be a central processing unit (CPU) or other general processors, digital signal processors (DSP), an application-specific integrated circuit (ASIC), a field-programmable gate array (FPGA), or other programmable logic devices, discrete gates, or transistor logic devices, discrete hardware assemblies, etc. The processor can also be integrated with members for storage, such as memory units and/or high-speed cache units.

In some embodiments, the steps of the above method can be completed by the integrated logic circuits in the processor or in the form of software instructions. The steps of the method of embodiments of the present disclosure can be directly implemented by a hardware processor, or a combination of hardware and software modules in the processor. The software modules can be located in storage media known in the art, such as random access memory, flash memory, read-only memory, programmable read-only memory, electrically erasable programmable memory, registers, etc. The storage medium can be located in the memory, and the processor can read the information from the memory and complete the steps of the method in connection with the hardware, which is not repeated here. Those of ordinary skill in the art can understand that the steps of the method of embodiments of the present disclosure can be implemented by electronic hardware or a combination of the computer software and electronic hardware. Whether these functions are executed in hardware or software depends on the specific application and design constraints of the technical solution. Those skilled in the art can use different methods to implement the described functions for each specific application. However, such implementation should not be considered as departing from the scope of the present disclosure.

In embodiments of the present disclosure, the values of the sequence numbers of the steps and processes do not indicate the execution order. The execution order of the steps or processes should be determined by the functions and internal logic and should not limit embodiments of the present disclosure.

In addition, although exemplary embodiments have been described in the present disclosure. The scope of the present disclosure includes any and all embodiments based on the equivalent elements, modifications, omissions, combinations (e.g., solutions with various cross embodiments), adaptations, or changes based on the present disclosure. The elements in the claims are broadly interpreted in accordance with the language used in the claims and are not limited to the examples described in the present specification. The examples of the elements are interpreted as non-exclusive. Therefore, the specification and the examples are intended to be considered as examples only, and the scope of the present disclosure is not limited here. Those skilled in the art can think of changes or replacements in the technical scope of the present disclosure. These changes and replacements are within the scope of the present disclosure. The real scope and spirit are subjected to all the scopes of the claims and the equivalent thereof.

The above description is for illustrative purposes and is not limiting. For example, the above examples (or one or more solutions) can be used in combination with each other. For example, Those of ordinary skill in the art can use other embodiments when reading the above description. In addition, features of embodiments of the present disclosure can be grouped to simplify the present disclosure, which should not be interpreted as that a disclosed feature without requiring protection is necessary for any claim. On the contrary, the subject of the present disclosure can have fewer features than all the features of disclosed embodiments. Thus, the claims can be used as examples or embodiments to be included in specific embodiments. Each claim can be used as an independent embodiment. These embodiments can be grouped or combined with each other. The scope of the present disclosure is subject to the claims and all the scope of equivalents of the claims.

What is claimed is:

1. A vehicle control method, comprising:
obtaining sensor information of different modalities of different onboard devices of a vehicle, and performing modality transformation on the sensor information to generate short-cycle message information of a unified modality;
sending the short-cycle message information to a first data model at a remote end;
generating long-cycle message information by a second data model configured at the vehicle based on the sensor information with the different modalities, the short-cycle message information having better real-time performance than the long-cycle message information, and the long-cycle message information being used to trigger the first data model to generate vehicle control information;
sending the long-cycle message information to the first data model at the remote end;
receiving the vehicle control information returned by the first data model at the remote end, the vehicle control information being a response of the first data model at the remote end to the long-cycle message information and being generated based on the short-cycle message information and the long-cycle message information; and
controlling the vehicle based on the vehicle control information.

2. The vehicle control method of claim 1, wherein the unified modality is multi-dimensional text, and the short-cycle message information includes a type identifier corresponding to the multi-dimensional text, enabling the first data model to recognize the unified modality.

3. The vehicle control method of claim 1, wherein controlling the vehicle based on the vehicle control information includes:
performing corresponding modality transformation on the vehicle control information according to different controlled onboard devices, enabling interaction information and/or control instructions with different modalities after the modality transformation to be recognized and executed by corresponding onboard devices.

4. The vehicle control method of claim 1, wherein:
a plurality of sets of vehicle control information are provided;
different sets of vehicle control information correspond to different time points; and
vehicle control information corresponding to a later time point is generated in connection with the short-cycle message information.

5. The vehicle control method of claim 4, wherein the vehicle control information corresponding to the later time point is generated in connection with the short-cycle message information including response information to vehicle control information corresponding to an earlier time point.

6. The vehicle control method of claim 1, wherein:
the second data model is a multi-modality information processing model; and
the second data model is trained based on multi-modality information corresponding to combinations of different statuses of the onboard devices and task conditions corresponding to the combinations when the vehicle is under various statuses.

7. The vehicle control method of claim 1, wherein:
the first data model determines related short-cycle message information based on the long-cycle message information and background information related to the vehicle; and
the vehicle control information is generated based on the related short-cycle message information and the long-cycle message information in connection with the background information.

8. The vehicle control method of claim 1, wherein:
the long-cycle message information includes task title information or the task title information and summary information; and
the summary information is generated by the second data model based on information related to the task title information in the sensor information of different modalities.

9. The vehicle control method according to claim 8, wherein:
the first data model determines related short-cycle message information based on the long-cycle message information and background information related to the vehicle;
the related short-cycle message information is fused with the summary information in the long-cycle message information;
the vehicle control information is generated based on the fused short-cycle message information and the summary information in connection with the background information.

10. The vehicle control method of claim 9, wherein the background information includes real-time or statistic information related to vehicle driving recognized or obtained by the first data model, including at least one of traffic conditions, weather information, status information of vehicle passengers, or statistic information of vehicle parts.

11. The vehicle control method of claim 1, further comprising:
transferring the short-cycle message information and the long-cycle message information to the first data model at the remote end in a streaming encryption transfer method.

12. A vehicle control system comprising:
a first interface configured to obtain sensor information of different modalities of different onboard devices of a vehicle;
a modality transformation member configured to perform modality transformation on the sensor information to generate short-cycle message information of a unified modality;
a second data model configured to generate long-cycle message information, the short-cycle message information having better real-time performance than the long-cycle message information, and the long-cycle message information being used to trigger the first data model to generate vehicle control information;
a second interface configured to send the short-cycle message information and the long-cycle message information to the first data model at the remote end and receive the vehicle control information returned by the first data model at the remote end, the vehicle control information being a response of the first data model at the remote end to the long-cycle message information and being generated based on the short-cycle message information and the long-cycle message information;
wherein the first interface is further configured to send the vehicle control information to a corresponding onboard device to enable the vehicle control information to be recognized and executed by the corresponding onboard device.

13. A non-transitory computer-readable storage medium storing computer-executable instructions that, when executed by a processor, cause the processor to:
obtain sensor information of different modalities of different onboard devices of a vehicle, and perform modality transformation on the sensor information to generate short-cycle message information of a unified modality;
send the short-cycle message information to a first data model at a remote end;
generate long-cycle message information by a second data model configured at the vehicle based on the sensor information with the different modalities, the short-cycle message information having better real-time performance than the long-cycle message information, and the long-cycle message information being used to trigger the first data model to generate vehicle control information;
send the long-cycle message information to the first data model at the remote end;
receive the vehicle control information returned by the first data model at the remote end, the vehicle control information being a response of the first data model at the remote end to the long-cycle message information and being generated based on the short-cycle message information and the long-cycle message information; and
control the vehicle based on the vehicle control information.

14. The storage medium of claim 13, wherein the unified modality is multi-dimensional text, and the short-cycle message information includes a type identifier corresponding to the multi-dimensional text, enabling the first data model to recognize the unified modality.

15. The storage medium of claim 13, wherein the processor is further configured to:
perform corresponding modality transformation on the vehicle control information according to different controlled onboard devices, enabling interaction information and/or control instructions with different modalities after the modality transformation to be recognized and executed by corresponding onboard devices.

16. The storage medium of claim 13, wherein:
a plurality of sets of vehicle control information are provided;
different sets of vehicle control information correspond to different time points; and
vehicle control information corresponding to a later time point is generated in connection with the short-cycle message information.

17. The storage medium of claim 16, wherein the vehicle control information corresponding to the later time point is generated in connection with the short-cycle message information including response information to vehicle control information corresponding to an earlier time point.

18. The storage medium of claim 13, wherein:
the second data model is a multi-modality information processing model; and
the second data model is trained based on multi-modality information corresponding to combinations of different statuses of the onboard devices and task conditions corresponding to the combinations when the vehicle is under various statuses.

19. The storage medium of claim 13, wherein:
the first data model determines related short-cycle message information based on the long-cycle message information and background information related to the vehicle; and
the vehicle control information is generated based on the related short-cycle message information and the long-cycle message information in connection with the background information.

20. The storage medium of claim 13, wherein:
the long-cycle message information includes task title information or the task title information and summary information; and
the summary information is generated by the second data model based on information related to the task title information in the sensor information of different modalities.

* * * * *